(12) United States Patent
Brita et al.

(10) Patent No.: US 11,377,534 B2
(45) Date of Patent: Jul. 5, 2022

(54) POLYOLEFIN DEPOLYMERIZATION WITH METAL OXIDES

(71) Applicant: Basell Poliolefine Italia S.r.l., Milan (IT)

(72) Inventors: Diego Brita, Ferrara (IT); Sheri E. Davis, Baytown, TX (US); Yulenty Deal, Kemah, TX (US); Simona Guidotti, Ferrara (IT); Dario Liguori, Ferrara (IT); Sandor Nagy, Seabrook, TX (US); Christopher D. Smith, Kingwood, TX (US); Daniel F. White, Houston, TX (US); Xueyong Yang, Bellaire, TX (US); Shahram Mihan, Bad Soden (DE)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 17/015,556

(22) Filed: Sep. 9, 2020

(65) Prior Publication Data

US 2021/0070959 A1     Mar. 11, 2021

Related U.S. Application Data

(60) Provisional application No. 62/897,794, filed on Sep. 9, 2019.

(51) Int. Cl.
   *C08J 11/16*     (2006.01)

(52) U.S. Cl.
   CPC ............ *C08J 11/16* (2013.01); *C08J 2323/06* (2013.01); *C08J 2323/12* (2013.01)

(58) Field of Classification Search
   USPC ........................................................ 521/47
   See application file for complete search history.

(56) References Cited

U.S. PATENT DOCUMENTS

| 7,247,258 B2 * | 7/2007 | Jung .................... B01J 37/0225 252/373 |
| 2012/0097518 A1 | 4/2012 | Fraczak et al. |
| 2014/0121408 A1 * | 5/2014 | Fraga ...................... B01J 21/04 562/538 |
| 2018/0361356 A1 | 12/2018 | Streiff et al. |

FOREIGN PATENT DOCUMENTS

| KR | 20110025368 A | 3/2011 |
| WO | 2010116211 A1 | 10/2010 |
| WO | 2017103012 A1 | 6/2017 |

OTHER PUBLICATIONS

JPH0724322; Machine Translation: Hirosuke Sumita et al. Production ofcracking catalyst Jul. 9, 1993 (Year: 1993).*
The International Search Report and The Written Opinion for PCT/EP2020/075169 dated Oct. 16, 2020.
Ibrahim et al., Facile Synthesis of Tungsten Oxide—Bismuth Vanadate Nanoflakes as Photoanode Material for Solar Water Splitting, International Journal of Hydrogen Energy, 42 (2017), pp. 3423-3430.
Salman et al., Comparative Thermal and Catalytic Recycling of Low Density Polyethylene into Diesel-Like Oil Using Different Commercial Catalysts, Electronic Journal of Environmental, Agricultural and Food Chemistry (EJEAFChe), 2012, pp. 96-105, 11(2), ISSN 1579-4377.

* cited by examiner

*Primary Examiner* — Terressa Boykin

(57) ABSTRACT

Methods of depolymerizing polyolefin-based material into useful petrochemical products using metal oxides and heat are described. The metal oxides improve the depolymerization reaction by decreasing the onset temperature for the depolymerization, which results in a higher depolymerization rate and a shorter residence time in the depolymerization unit, allowing for a predictable depolymerization reaction, and decreasing the branching or aromatic formations in the product.

19 Claims, No Drawings

POLYOLEFIN DEPOLYMERIZATION WITH METAL OXIDES

PRIOR RELATED APPLICATIONS

This application claims the benefit of priority to U.S. Provisional Application No. 62/897,794, filed on Sep. 9, 2019, which is incorporated here by reference in its entirety.

FEDERALLY SPONSORED RESEARCH STATEMENT

Not applicable.

REFERENCE TO MICROFICHE APPENDIX

Not applicable.

FIELD OF THE DISCLOSURE

The disclosure relates to methods of depolymerizing polyolefin-based material using metal oxides and heat to form useful petrochemical products.

BACKGROUND OF THE DISCLOSURE

Heightened standards of living and increased urbanization have led to an increased demand for polymer products, particularly polyolefin plastics. Polyolefins have been frequently used in commercial plastics applications because of their outstanding performance and cost characteristics. Polyethylene (PE), for example, has become one of the most widely used and recognized polyolefins because it is strong, extremely tough, and very durable. This allows for it to be highly engineered for a variety of applications. Similarly, polypropylene (PP) is mechanically rugged yet flexible, is heat resistant, and is resistant to many chemical solvents like bases and acids. Thus, it is ideal for various end-use industries, mainly for packaging and labeling, textiles, plastic parts and reusable containers of various types.

The downside to the demand for polyolefin plastics is the increase in waste. Post-consumer plastic waste typically ends up in landfills, with about 12% being incinerated and about 9% being diverted to recycling. In landfills, most plastics do not degrade quickly, becoming a major source of waste that overburdens the landfill. Incineration is also not an ideal solution to treating the plastic wastes as incineration leads to the formation of carbon dioxide and other greenhouse gas emissions. As such, there has been much interest in developing methods of recycling plastic waste to reduce the burden on landfills while being environmentally friendly.

A drawback to the recycling of plastic wastes is the difficulty in successfully producing commercially usable or desirable products. Plastic waste recycling currently includes washing the material and mechanically reprocessing it; however, the resulting pellets remain contaminated with impurities such as food residue, dyes, and perfume. These impurities render the pellets undesirable for most uses based on both performance and appearance.

Recent advances have focused on converting plastic waste to useable products like fuel sources or commercially important raw material. Methods of performing pyrolysis of the plastic waste stream followed by catalytic depolymerization have been developed to generate various products: gases, gasoline fractions, kerosene fractions, diesel fractions and waxes.

Unfortunately, these processes are costly and time-consuming because they require a lot of energy to fully decompose polyolefin wastes to useful classes of products. Further, the reaction products themselves are unpredictable due to secondary reactions occurring under pyrolysis conditions, resulting in the formation of branched and aromatic products. The catalysts themselves also tend to be easily poisoned by impurities in the polymer feed.

Despite the advances made in recycling polymers, there is a continued need for the development of a robust process for the conversion of plastics to useful petrochemical products that minimizes formation of branched and/or aromatics products.

SUMMARY OF THE DISCLOSURE

The present disclosure provides improved methods for thermally depolymerizing polyolefin-based material. The improved methods rely on thermally depolymerizing a feed stream with one or more polyolefins in the presence of at least one metal oxide. Specifically, small amounts of one or more metal oxides are mixed with a polyolefin-based material in a depolymerization unit and heated in the absence of oxygen. The metal oxide(s) initiates a radical depolymerization reaction that can take place at lower temperatures than depolymerization reactions without the metal oxide. This radical depolymerization results in the formation of liquid products with minimal branching or aromatic formation at lower operational temperatures. The liquid products can then be used as is, or undergo further processing in e.g. olefins crackers, to improve the feedstock.

The methods described herein can be used to treat any polyolefin-based material, including post-industrial waste and post-consumer use. Treatment of post-consumer polyolefin waste is of particular importance due to the overburdening of landfills and the potential to generate raw materials from the wastes. The methods described here relate to the processing of post-consumer waste after it has been sorted by the processing center at a landfill, or other recycling center, to separate polyolefin-based materials from other recyclable materials such as glass, cellulose (paper), polyvinyl polymers, and the like.

The present disclosure includes any of the following embodiments in any combination(s):

A method of depolymerizing polyolefins comprising adding a polyolefin-based feed stream and at least one metal oxide to a reactor heated to a first temperature; and reacting the polyolefin-based feed stream with the at least one metal oxide to depolymerize the polyolefin-based feed stream.

A method of depolymerizing polyolefins comprising adding a polyolefin-based feed stream and at least one metal oxide to a reactor heated to a first temperature; and reacting the polyolefin-based feed stream with the at least one metal oxide to depolymerize the polyolefin-based feed stream, wherein an onset temperature of depolymerization for the polyolefin-based feed stream is 5% less than the onset temperature of the same polyolefin-based feed stream without a metal oxide, and the rate of depolymerization of the polyolefin-based feed stream is at least 10% higher than the rate of depolymerization for the same polyolefin-based feed stream without a metal oxide.

Any of the above methods where the at least one metal oxide is chosen from a group consisting of SnO, FeO, CuO, MgO, $TeO_2$, $NbO_2$, $MoO_2$, $MnO_2$, $TiO_2$, $WO_2$, $MoO_3$, $GeO_3$, $WO_3$, $Ag_2O$, $Sb_2O_3$, $Ga_2O_3$, $Nb_2O_3$, $CeO_2$, $V_2O_3$, $Bi_2O_3$, $Al_2O_3$, $Er_2O_3$, $In_2O_3$, $B_2O_3$, PdO, $Sb_2O_5$, $Y_2O_3$, $SnO_2$, $Fe_2O_3$, $PtO_2$, $ZrO_2$, or combinations thereof. Alternatively, the at least one metal oxide is chosen from a group comprising $WO_3$, MgO, $Al_2O_3*TiO_2$, $Sb_2O_3$, $MoO_3$, $MoO_2$, or $Bi_2O_3$.

Any of the above methods where the at least one metal oxide is Aluminum Titanium Oxide ($Al_2O_3*TiO_2$).

Any of the above methods where the polyolefin-based feed stream is a low density polyethylene, a high density polyethylene, a polypropylene, or a combination thereof.

Any of the above methods where the polyolefin-based feed stream is post-consumer waste.

Any of the above methods where the polyolefin-based feed stream is post-industrial waste.

Any of the above methods where the polyolefin-based feed stream comprises both post-industrial waste and post-consumer waste.

Any of the above methods where the rate of depolymerization of the polyolefin-based feed stream is at least 10% higher than the rate of depolymerization for the same polyolefin-based feed stream without a metal oxide Any of the above methods where the rate of depolymerization in the presence of a metal oxide is 15% less than the rate of depolymerization of the polyolefin-based feed stream without said metal oxide.

Any of the above methods where the ratio of polyolefin-based feed stream to metal oxide is at least 5:1 or at least 20:1 or at least 50:1.

Any of the above methods where an onset temperature of depolymerization for the polyolefin-based feed stream is 5% less than the onset temperature of the same polyolefin-based feed stream without a metal oxide.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Not applicable.

Definitions

As used herein, "on-set temperature" means the temperature at which liquid products are first observed in laboratory scale depolymerization units. A lower "on-set temperature" translates into less energy needed to perform the depolymerization reaction. This temperature correlates to the operational temperature of an industrial scale depolymerization unit.

As used herein, "initial boiling point" refers to the boiling point needed to evaporate 0.5 wt % of the liquid products generated by the thermal depolymerization.

The "final boiling point," or FBP, refers to the boiling point needed to evaporate 99.5 wt % of the liquid products generated by the thermal depolymerization. The final boiling point can be helpful from a depolymerized product property perspective in that it can predict if the depolymerized stream needs to undergo further processing as well as cracker requirements or preferences for the depolymerized stream. Changes in final boiling points due to the addition of one or more metal oxide initiators can be used to predict increases/decreases in higher (or lower) molecular weight compounds in the depolymerized product for the specific metal oxide combination. Higher molecular weight compounds tend to affect downstream process like crackers, thus their reduction is desired. The FBP can thus be used to determine the ability of downstream equipment, like crackers, to process the depolymerized product and predict cracker settings for a specific depolymerized product composition.

As used herein, "residence time" refers to the time needed to depolymerize a batch of polymer waste in a depolymerization unit.

As used herein, the terms "depolymerization half time" or "half time of depolymerization" refer to the time needed to achieve a 50% loss of mass of a sample at a specific temperature during a TGA thermolysis reactions.

As used herein, "thermolysis" refers to a thermal depolymerization reaction occurring in the absence of oxygen.

As used herein, "post-consumer waste" refers to a type of waste produced by the end consumer of a material stream.

As used herein, "post-industrial waste" refers to a type of waste produced during the production process of a product.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| GPC | Gel Permeation Chromatography |
| 1H NMR | Proton Nuclear Magnetic Resonance |
| FBP | Final boiling point |
| GC | Gas Chromatography |
| HDPE | High density polyethylene |
| INPIBP | Initial boiling point |
| NMR | Nuclear Magnetic Resonance |
| PE | polyethylene |
| PP | polypropylene |
| sccm | standard cubic centimeters per minute |
| TGA | Thermogravimetric Gravimetric Analysis |
| wt % | weight percent |

DESCRIPTION OF EMBODIMENTS OF THE DISCLOSURE

The present disclosure provides improved methods for recycling polyolefin-based materials into commercially important raw material using metal oxides. Specifically, at least one metal oxide is mixed with a polyolefin-based feed stream comprising at least one polyolefin-based material in a depolymerization unit. A thermolysis reaction is performed in the depolymerization unit, wherein the metal oxide initiates the depolymerization of the polyolefin-based material to generate a usable liquid product with minimal branching or aromatics formation.

There are many advantages of using metal oxides to improve the thermal depolymerization of the polyolefins. As mentioned above, the metal oxides are not catalysts for the recycling process. Rather, the metal oxides act as initiators facilitating a radical depolymerization of the polymers in the feed stream. This limits isomerization reactions during depolymerization, resulting in a simpler mix of reaction products that are similar to the products from the same feed stream depolymerized without a metal oxide. Thus, the reaction products for a given polymer feed stream composition are easily predictable.

The presence of the metal oxide also reduces the onset temperature that liquid products are first formed in the depolymerization unit, compared to depolymerization without a metal oxide. This results in a decrease in both the operational temperature of the depolymerization unit and the residence time of the polyolefin feed stream in the depolymerization unit, which leads to reduced energy costs.

Another advantage is the customizability of the metal oxide selection to the composition of the polyolefin feed stream. While all metal oxides of the presently described methods facilitate improvements in the thermal depolymerization process, the degree of improvement can vary between the selected metal oxides and the composition of the polyolefin feed. As such, combinations of metal oxides may be utilized to process various combinations of polyolefins in the feed stream. This is especially important when treating post-consumer polyolefin waste as the composition of this particular waste differs both regionally and seasonally. Regardless of the metal oxide(s) used, however, the resulting depolymerization products will be similar to polyolefin waste streams depolymerized without a metal oxide.

Finally, the metal oxides are robust in that they are less likely to be affected by 'poisons' in the polymer feed stream than other traditional depolymerization catalysts.

Any known metal oxide can be used, including oxides containing metals from Groups 2-8 and 11-16, as well as the lanthanoids and actinoids. Exemplary metal oxides for use in the present methods include SnO, FeO, CuO, MgO, $TeO_2$, $NbO_2$, $MoO_2$, $MnO_2$, $TiO_2$, $WO_2$, $MoO_3$, $GeO_3$, $WO_3$, $Ag_2O$, $Sb_2O_3$, $Ga_2O_3$, $Nb_2O_3$, $CeO_2$, $V_2O_3$, $Bi_2O_3$, $Al_2O_3$, $Er_2O_3$, $In_2O_3$, $B_2O_3$, PdO, $Sb_2O_5$, $Y_2O_3$, $SnO_2$, $Fe_2O_3$, $PtO_2$, $ZrO_2$, $La_2O_3$, $BaTiO_3$, $CaWO_4$ or combinations thereof. In some embodiments, the metal oxide(s) can be chosen from a group comprising $WO_3$, MgO, $Al_2O_3*TiO_2$, $Sb_2O_3$, $MoO_3$, $MoO_2$, or $Bi_2O_3$. Some embodiments of the present methods may utilize non-toxic metal oxides such as $TiO_2$, $MoO_2$, or $Bi_2O_3$. In other embodiments, the selected metal oxide may include molybdenum because the metallic residue of the reduced oxide post-thermolysis can be used in steel industry.

The presently described methods can be applied to a feed stream comprising material with a single polyolefin component, or a mixture of polyolefin components in any amount. Any polyolefin can be present in the feed stream, including but not limited to, polyethylene (both high and low density), polypropylene, ethylene-propylene copolymers, polybutene-1, polyisobutene, and copolymers thereof. Further, the waste is not limited to any particular form so films, foams, textiles or other shaped material can be treated with the described methods.

The polyolefin-based material, combined with the selected metal oxides(s), will be treated in depolymerization units with temperatures between about 200 and about 600° C. Alternatively, the temperature of the depolymerization unit will be between about 225 and about 500° C. In yet another alternative, the temperature of the depolymerization unit will be between about 250 and about 450° C. The polyolefin feed stream will be treated in batches in the depolymerization unit due to the residence time needed to fully depolymerize the stream. The estimated residence time for each batch will be between about 30 to about 180 minutes, depending on the heat transferability of the depolymerization unit. Alternatively, the estimated residence time is about 60 minutes.

As the metal oxide is acting as an initiator to the depolymerization reaction, amounts of less than 20% by weight of the batch polyolefin feed stream are needed. Alternatively, the amount of metal oxide is between >0 and 5% by weight of the batch polyolefin feed stream or between 2% and 2.5%. In yet another alternative, the metal oxide is present in an amount of 2% or 2.5% by weight of the batch polyolefin feed stream.

The presently disclosed methods are exemplified with respect to the examples below. However, these are exemplary only, and the invention can be broadly applied to any polyolefin feed and metal oxide combination. The following examples are intended to be illustrative only, and not unduly limit the scope of the appended claims.

EXAMPLES

The following examples are included to demonstrate embodiments of the appended claims. Those of skill in the art should appreciate that many changes can be made in the specific embodiments which are disclosed and still obtain a like or similar result without departing from the spirit and scope of the disclosure herein. In no way should the following examples be read to limit, or to define, the scope of the appended claims.

Glass Reactor Depolymerization

A series of examples with a feed comprising a single polyolefin were depolymerized using a 500 mL round glass reactor having three necks equipped with thermocouple and nitrogen inlet in the first two necks. Through the third neck, the glass reactor was connected with two glass condensers (in series) kept at 110° C. and −8° C. respectively using two oil baths (Cryostat Julabo). The glass reactor was placed in an electrically heating system (mantle bath) and, setting the desired power, the temperature was raised up to 550° C. The depolymerization efficiency was characterized by the temperature of reaction mixture when condensation of liquid product was first observed ($T_{onset}$) in the condensers; yield of liquid condensable (L %) in the ice trap (with respect to the polymer charged); and the yield of solid residue (S %) in the reactor, excluding the metal oxide (and, with respect to the polymer charged).

The single polyolefin in the feed was polypropylene (grade Moplen HP522H, a LyondellBasell product). For the examples, 30 g of this polypropylene was mixed with 0.8 g (2.5% by weight) of a commercially available metal oxide or a tungsten oxide ($WO_3$) prepared according to the procedure in Ibrahim 2017. The liquid products from the thermolysis reaction were collected in an ice trap and analyzed, as described below, to compare the liquid products with those formed by depolymerization of the same polyolefin feed without a metal oxide.

Characterization of liquid products: The liquid products from the ice trap were characterized by Gas Chromatography (GC), proton NMR (1H NMR), and Gel Permeation Chromatography (GPC) data.

The GC analysis of the liquid product for each depolymerized PP/metal oxide mixture was performed using an Agilent 7890 GC (Agilent Technologies, Santa Clara, Calif.)

equipped with a standard non-polar column and a flame ionization detector. For the GC data, the weight percent for x<nC7, nC7<x<nC11, nC12<x<nC28, x>C28 were used to characterize the liquid product.

NMR data were used to characterize the percent of aromatic protons, paraffinic protons and olefinic protons in the liquid product. The examples were analyzed with an addition of $CDCl_3$ (0.6 g of depolymerize polymer/metal oxide mixture with 0.4 g of $CDCl_3$). The data were collected on a Bruker AV500 MHz NMR spectrometer (Bruker Corporation, Billerica, Mass.) at 25° C. with a 5 mm Prodigy probe. One dimension 1H NMR data were processed using TOPSPIN® software (Bruker) with an exponential line broadening window function. Quantitative measurements were performed with a 15 second relaxation delay, a 30° flip angle pulse, and 32 scans to facilitate accurate integrals. The spectral integrations for aromatic olefinic, and paraffinic protons were obtained and used to quantify relative ratios of these protons.

GPC was used to measure the molecular weight and molecular weight distribution (MWD) of the liquid product in 1,2,4-trichlorobenzene (TCB) using GPC-IR (Polymer Char, Valencia, Spain), a high temperature GPC dedicated to Polyolefin analysis. The GPC-IR was equipped with a column set of four PLgel Olexis mixed-bed (Polymer Laboratories, Church Stretto, UK) and an IRS infrared detector (Polymer Char). The dimensions of the columns were 300× 7.5 mm, and their particle size 13 μm. The mobile phase flow rate was kept at 1.0 mL/min. The measurements were carried out at 150° C. Solution concentrations were 2.0 mg/mL (at 150° C.) and 0.3 g/L of 2,6-diterbuthyl-p-chresole were added to prevent degradation. Vials were also solubilized in N2 atmosphere.

For GPC calculation, a universal calibration curve was obtained using 12 polystyrene (PS) standards supplied by Polymer Char (peak molecular weights ranging from 266 to 1220000). A third order polynomial fit was used for interpolating the data and obtaining the relevant calibration curve. Data acquisition and processing was done by using Empower 3 (Waters, Milford Mass.).

The Mark-Houwink relationship (intrinsic viscosity=K* (molecular weight)$^a$) was used to determine the molecular weight distribution and the relevant average molecular weights: the K values were KPS=1.21×10-4 dL/g, and KPP=1.90×10-4 dL/g for PS (calibration) and PP respectively, while the Mark-Houwink exponents a=0.706 for PS and a=0.725 for PP were used.

Results: Table 1 displays the results from the depolymerization of a PP only feed stream in a glass reactor. The metal oxides facilitated an improvement in the depolymerization of this particular polymer feed.

TABLE 1

Results from Glass Reactor depolymerization of PP with metal oxide

| Process Parameter/Liquid Property | Comp. Ex. 1 | Ex. 2 | Ex. 3 | Ex. 4 |
|---|---|---|---|---|
| Oxide | None | $Al_2O_3$*$TiO_2$ | $WO_3$ | MgO |
| Depolymerization Time | | | | |
| | 38 | 28 | 28 | 34 |
| $T_{onset}$, ° C. | 275 | 245 | 266 | 270 |
| L % | 79 | 81 | 77 | 78 |
| S % | <1 | <1 | <1 | <1 |
| GC Data | | | | |
| X < nC7 | 3 | 4 | 3 | 4 |
| nC7 < x < nC11 | 32 | 45 | 31 | 42 |
| nC12 < x < nC28 | 57 | 47 | 58 | 52 |
| X > C28 | 8 | 4 | 8 | 2 |
| NMR Date | | | | |
| Aromatic 1H, % | 0.03 | 0.10 | 0.12 | 0.03 |
| Paraffinic 1H, % | 93.5 | 96.0 | 95.2 | 93.2 |
| Olefinic 1H, % | 6.5 | 4.0 | 4.7 | 6.8 |
| GPC Date | | | | |
| Mw | 378 | 340 | 373 | 361 |
| Mn | 192 | 151 | 187 | 181 |

For the comparative sample, the thermolysis was carried out without any metal oxides. The depolymerization time was 38 minutes. In contrast, all of the examples with a metal oxide were able to reduce the depolymerization time by more than 11%. Both Aluminum Titanium Oxide ($Al_2O_3$*$TiO_2$) and Tungsten Oxide ($WO_3$) reduced the depolymerization time to 28 minutes; and, Magnesium Oxide (MgO) reduced the depolymerization time to 34 minutes.

The combination of $Al_2O_3$*$TiO_2$ in Example 2 produced more differences as compared with the comparative sample. This combination reduced the onset temperature by 30° C. This is beneficial as a lower onset temperature translates to a lower operating temperature for large-scale depolymerization units which, when combined with the reduction in residence time, means a reduction in energy costs for the thermolysis. Additional differences were seen in the composition of the liquid products, including the largest decrease in the molecular weight of the products, and a larger production of hydrocarbons in the C7-C11 range as opposed to C12-C28, as well as a decrease in the >C28 fraction.

The metal oxides in Examples 3 and 4 reduced the onset temperature for liquid condensation and average molecular weight of the products. While these metal oxides did not reduce the onset temperature as much as Example 2, the results are feed dependent. That is, changing the composition of the feed will affect the ability of the metal oxide to aid in the radical depolymerization. Thus, it is expected that $WO_3$ and MgO may offer similarly large decreases in onset temperatures for different polyolefins, or combination thereof.

TGA Depolymerization

To further investigate the effect of polyolefin feed composition, a series of mixed polyolefin feed streams were processed using Thermogravimetric Analysis (TGA) as the depolymerization unit. The feed consisted of a 1:1 mixture of HDPE (grade ACP9255, a LyondellBasell product) and polypropylene (grade HP522, a LyondellBasell product). Uniform samples were prepared with 4 g of the polymer mixture melt-compounded with commercially available $MoO_2$, $Bi_2O_3$, or $Sb_2O_3$, in an amount of 2.5% by weight (~0.1 g), in a HAAK MiniCTW compounder at 200° C. and 200 RPM for 5 minutes.

For the TGA thermolysis reactions, the uniform HDPE/PP and metal oxide mixtures were heated under nitrogen at 10K/min to the desired depolymerization temperature in a Mettler Toledo TGA/DSC 3+(Mettler Toledo, Columbus, Ohio) and held for 1 hour. For this example, a depolymerization temperature of 400° C. was used. The depolymerization half time at a specific temperature, defined as the time needed to achieve a 50% loss of mass, was recorded directly if the value was less than 60 min, or determined under the assumption of first order decomposition kinetics as $t_{1/2}=0.693/k$, where k is the first order rate constant determined graphically using a $Ln(C_0/C)$ vs time plot.

The depolymerization half time is relative to the residence time needed in a large scale depolymerization unit. The shorter the half time, the shorter the residence time for a batch of a polymer feed in a depolymerization unit, and the higher the depolymerization rate. The results for this depolymerization process are shown in Table 2.

Comparative Example 2 (Comp. Ex. 2) was depolymerized with no metal oxide. The depolymerization half time for Comp. Ex. 2 was 96 minutes at 400° C. The addition of a metal oxide reduced the half time for this HDPE/PP feed. $Bi_2O_3$ resulted in a reduction of 10%, with a half time of 86 min. $MoO_2$ reduced the half time by about 50% (48 min) and $Sb_2O_3$ reduced the half time by about 37.5% (60 min). Thus, each metal oxide was able to demonstrate an improvement on the depolymerization rate, which translates to less time being needed for depolymerization in a larger scaled reactor.

TABLE 2

Results from TGA depolymerization of 1:1 mixture of HDPE and PP with subvalent metal oxide

| | Comp. Ex. 2 | Ex. 5 | Ex. 6 | Ex. 7 |
|---|---|---|---|---|
| Oxide | None | $MoO_2$ | $Bi_2O_3$ | $Sb_2O_3$ |
| Half Time (min)* | 96 | 48 | 86 | 60 |
| Half Time reduction | n/a | 50% | 10% | 37.5% |

*at 400° C.

Other metal oxides, including transition metals, post-transition metals, lanthanides, and metalloids, would reduce the half time of the depolymerization of the 1:1 mixture of HDPE and Polypropylene by about 10% to about 60%.

PARR Reactor Depolymerization

A series of examples consisting of a 1:1 mixture of HDPE and Polypropylene feed were also depolymerized using a Hastelloy Parr Reactor. Commercially available metal oxides containing metals from Groups 4-8 and 11-16 were selected such that the examples included transition metals, post-transition metals, lanthanides, and metalloids.

For the depolymerization using a Parr reactor, 20 g of the polymer feed along, with 2.5% by weight of a metal oxide, was placed in a closed 125 ml Parr reactor, at 11 psig pressure and constant nitrogen flow of 100 sccm. The Parr reactor was then placed in the hot zone of a furnace preheated to 650° C.

The vapors exiting the Parr reactor were condensed in an ice trap to create the liquid product for analysis. The depolymerization efficiency was characterized by temperature of reaction mixture when condensation of liquid product first observed ($T_{onset}$); yield of liquid (L %) condensable in the ice trap, and the yield of solid residue (S %) in the reactor, excluding the catalyst.

Characterization of liquid products: The liquid products from the ice trap were characterized by Gas Chromatography (GC), Simulated Distillation (SimDist), and proton NMR (1H NMR).

The GC analysis of the liquid product for each depolymerized polymer/metal oxide mixture was performed using an Agilent 7890 GC (Agilent Technologies, Santa Clara, Calif.) equipped with a standard non-polar column and a flame ionization detector. The weight percent for C2-C4, C5, C6, C7, C8, C9 and heavier, linear α-olefins, n-paraffins, and C6-C8 aromatics (with co-elutions) were used to characterize the liquid product.

SimDist per ASTM D7213 ("Standard Test Method for Boiling Range Distribution of Petroleum Distillates in the Boiling Range from 100° C. to 615° C. by Gas Chromatography") was used to quickly and accurately determine the true boiling point distribution of the depolymerized liquid product. Using an Agilent 6980 GC (Agilent Technologies, Santa Clara, Calif.), SimDist data were collected for a series of boiling ranges based on weight percent of vaporized depolymerized polymer/metal oxide mixture, from the initial boiling point at 0.5 wt % vaporized to the final boiling point at 99.5 wt % vaporized.

NMR data were used to characterize the percent of aromatic protons, paraffinic protons and olefinic protons in the liquid product. The examples were analyzed with an addition of $CDCl_3$ (0.6 g of depolymerize polymer/metal oxide mixture with 0.4 g of $CDCl_3$). The data were collected on a Bruker AV500 MHz NMR spectrometer (Bruker Corporation, Billerica, Mass.) at 25° C. with a 5 mm Prodigy probe. One dimension 1H NMR data were processed using TOPSPIN® software (Bruker) with an exponential line broadening window function. Quantitative measurements were performed with a 15 second relaxation delay, a 30° flip angle pulse, and 32 scans to facilitate accurate integrals. The spectral integrations for aromatic olefinic, and paraffinic protons were obtained and used to quantify relative ratios of these protons.

While all of the metal oxides improved the depolymerization of this particular polymer feed, it was found that some metal oxides were able to decrease the onset temperature by a greater extent than other metal oxides. For the purpose of these examples, metal oxides that reduced the onset temperature by about 5% or more were considered "active" for this particular polymer sample. The use of different polymer feed mixtures could result in some or all of the alternative metal oxides reducing onset temperatures by 5% or more.

Table 3 displays the results for the 1:1 mixture of HDPE/PP polymer feed mixed with an 'Alternative' metal oxide (Alt.), and Table 4 displays the results for the 'Active' metal oxide (Act.).

Comparative Example 3 was depolymerized without a metal oxide, resulting in a waxy liquid, an onset temperature of 430° C. and a FBP (99.5% vaporized) of 503° C. When a metal oxide was added, regardless of catalytic activity, the liquid product changed to a clear yellow liquid. However, as displayed in Tables 3 and 4, not all of the metal oxides reduced the onset temperature or the FBP or both.

As explained above, the Alternative Examples 4-11 did not reduce the onset temperatures by 5% or more as compared with the Comparative Example 3. However, some of these metal oxides reduced the final boiling point by about 20° C., such as Alt. Examples 4 and 10. The reduction in final boiling point is an indicator of a better product property for the liquid product that will be further processed. Specifically, a lower final boiling point indicates that the depolymerized stream has less heavier compounds, which tend to contaminate the furnace going into a cracker. As such, the cracker will be able to easily process these streams with minimal contamination when compared to the example without a metal oxide initiator.

TABLE 3

Results from Reactor depolymerization of 1:1 mixture of HDPE and PP with alternative metal oxide

| Process Parameter/Liquid Property | Comp. Ex. 3 | Alt. Ex. 3 | Alt. Ex. 4 | Alt. Ex. 5 | Alt. Ex. 6 | Alt. Ex. 7 | Alt. Ex. 8 | Alt. Ex. 9 | Alt. Ex. 10 | Alt. Ex. 11 |
|---|---|---|---|---|---|---|---|---|---|---|
| Oxide | none | $CeO_2$ | $Nb_2O_5$ | $MoO_3$ | $MnO_2$ | FeO | CuO | $Ga_2O_3$ | $GeO_2$ | $TeO_2$ |
| $T_{onset}$, °C. | 430 | 421 | 425 | 418 | 422 | 432 | 423 | 430 | 428 | 423 |
| L %, % | 88.9 | 89.6 | 86.3 | 89.2 | 89.4 | 89.5 | 89.1 | 87.4 | 90.7 | 86.9 |
| S %, % | <1 | <1 | <1 | <1 | <1 | <1 | <1 | <1 | <1 | <1 |
| GC Data | | | | | | | | | | |
| C2-C4s, % | 1.09 | 1.13 | 0.96 | 1.17 | 1.12 | 1.13 | 1.08 | 0.97 | 0.96 | 1.47 |
| C5s, % | 4.54 | 3.87 | 3.94 | 4.11 | 4.25 | 4.40 | 4.20 | 3.71 | 3.93 | 4.09 |
| C6s, % | 5.66 | 5.45 | 5.85 | 5.52 | 5.92 | 5.93 | 6.11 | 5.24 | 5.43 | 5.85 |
| C7s, % | 3.29 | 3.06 | 3.47 | 3.01 | 3.23 | 3.32 | 3.37 | 3.05 | 3.06 | 2.44 |
| C8s, % | 5.72 | 5.40 | 5.59 | 5.20 | 5.75 | 5.99 | 6.05 | 5.11 | 5.41 | 4.64 |
| C9s and heavier, % | 79.70 | 81.09 | 80.23 | 80.99 | 79.72 | 79.24 | 79.19 | 81.93 | 81.21 | 81.52 |
| Linear α-olefins, % | 18.17 | 17.61 | 19.54 | 19.03 | 18.88 | 18.33 | 18.62 | 19.34 | 18.49 | 17.75 |
| n-paraffins, % | 23.25 | 25.81 | 23.13 | 24.27 | 23.71 | 23.30 | 23.37 | 24.80 | 24.68 | 28.11 |
| C6-C8 aromatics, % | 0.78 | 0.81 | 0.82 | 0.77 | 0.58 | 0.58 | 0.62 | 0.54 | 0.54 | 0.51 |
| SimDist Data | | | | | | | | | | |
| IBP, 0.5 wt % off (° C.) | 26 | 27 | 35 | 29 | 28 | 33 | 29 | 32 | 28 | 27 |
| 10 wt % off (° C.) | 104 | 99 | 110 | 111 | 101 | 110 | 100 | 103 | 99 | 107 |
| 30 wt % off (° C.) | 172 | 171 | 174 | 177 | 171 | 172 | 172 | 173 | 171 | 174 |
| 50 wt % off (° C.) | 249 | 249 | 252 | 255 | 248 | 248 | 248 | 252 | 246 | 252 |
| 70 wt % off (° C.) | 318 | 320 | 323 | 331 | 317 | 317 | 316 | 323 | 316 | 330 |
| 90 wt % off (° C.) | 398 | 400 | 396 | 411 | 396 | 397 | 394 | 398 | 392 | 417 |
| FBP, 99.5 wt % off (° C.) | 503 | 489 | 481 | 503 | 489 | 492 | 491 | 485 | 480 | 510 |
| NMR Date | | | | | | | | | | |
| Aromatic 1H, % | 0.12 | 0.19 | 0.16 | 0.17 | 0.16 | 0.16 | 0.20 | 0.17 | 0.16 | 0.44 |
| Paraffinic 1H, % | 92.84 | 92.49 | 92.41 | 92.55 | 92.47 | 92.52 | 92.49 | 92.42 | 92.47 | 92.68 |
| Olefinic 1H, % | 7.04 | 7.32 | 7.43 | 7.29 | 7.37 | 7.33 | 7.31 | 7.38 | 7.37 | 6.88 |

In contrast to the Alternative Examples, the Active Examples in Table 4 were able to reduce the onset temperature by 30-100° C., which was greater than the 5% reduction cut off. In spite of the reduction in onset temperatures, the final boiling points did not vary significantly when compared to Comparative Example 3.

Thus, Table 3 and 4 both illustrate depolymerization improvements for all metal oxides and display how the different oxides can affect depolymerization of the polymer feed. The lower onset temperatures associated with the Active Examples support a lower energy requirement to perform the depolymerization process. The lower final boiling points produced with both of the Active and Alternative Examples indicate a lower amount of heavier compounds, which translates into a more desirable product for downstream processing. This decrease in heavier compounds was visually confirmed in that all metal oxides resulted in the production of liquid products, not the waxy product produced in the absence of a metal oxide.

TABLE 4

Results from Reactor depolymerization of 1:1 mixture of HDPE and PP with active metal oxide

| Process Parameter/Liquid Property | Act. Ex. 4 | Act. Ex. 5 | Act. Ex. 6 | Act. Ex. 7 | Act. Ex. 8 | Act. Ex. 9 | Act. Ex. 10 | Act. Ex. 11 |
|---|---|---|---|---|---|---|---|---|
| Oxide | $V_2O_3$ | $NbO_2$ | $MoO_2$ | $WO_2$ | $Ag_2O$ | SnO | $Sb_2O_3$ | $Bi_2O_3$ |
| Depolymerization efficiency | | | | | | | | |
| $T_{onset}$, °C. | 365 | 374 | 366 | 321 | 390 | 378 | 340 | 342 |
| L %, % | 88.62 | 86.0 | 89.7 | 88.7 | 87.9 | 89.0 | 88.2 | 88.9 |
| S %, % | <1 | <1 | <1 | <1 | <1 | <1 | <1 | <1 |
| GC Data | | | | | | | | |
| C2-C4s, % | 1.08 | 1.06 | 1.24 | 0.97 | 1.05 | 1.07 | 0.96 | 0.91 |
| C5s, % | 4.18 | 4.07 | 4.30 | 4.24 | 4.04 | 4.07 | 4.03 | 3.60 |
| C6s, % | 5.73 | 5.91 | 5.75 | 5.94 | 5.80 | 5.66 | 5.76 | 5.34 |
| C7s, % | 3.33 | 3.45 | 3.29 | 3.51 | 3.27 | 3.18 | 3.20 | 3.17 |
| C8s, % | 5.81 | 5.67 | 5.85 | 6.21 | 5.90 | 5.64 | 5.79 | 5.51 |
| C9s and heavier, % | 79.86 | 79.83 | 79.57 | 79.13 | 79.94 | 80.38 | 80.27 | 81.46 |
| α-olefins, % | 18.45 | 19.52 | 18.90 | 18.02 | 18.64 | 18.62 | 18.29 | 19.48 |
| n-paraffins, % | 23.79 | 23.52 | 23.87 | 23.15 | 23.17 | 24.58 | 23.94 | 24.08 |
| C6-C8 aromatics, % | 0.80 | 0.80 | 0.79 | 0.63 | 0.58 | 0.57 | 0.81 | 0.76 |

TABLE 4-continued

Results from Reactor depolymerization of 1:1 mixture of HDPE and PP with active metal oxide

| Process Parameter/Liquid Property | Act. Ex. 4 | Act. Ex. 5 | Act. Ex. 6 | Act. Ex. 7 | Act. Ex. 8 | Act. Ex. 9 | Act. Ex. 10 | Act. Ex. 11 |
|---|---|---|---|---|---|---|---|---|
| SimDist Data | | | | | | | | |
| IBP, 0.5 wt % off (° C.) | 27 | 28 | 27 | 29 | 27 | 30 | 36 | 35 |
| 10 wt % off (° C.) | 102 | 109 | 99 | 104 | 102 | 113 | 110 | 112 |
| 30 wt % off (° C.) | 171 | 173 | 169 | 168 | 171 | 174 | 173 | 174 |
| 50 wt % off (° C.) | 246 | 252 | 243 | 240 | 246 | 252 | 249 | 252 |
| 70 wt % off (° C.) | 317 | 322 | 316 | 313 | 316 | 326 | 317 | 326 |
| 90 wt % off (° C.) | 397 | 400 | 396 | 390 | 393 | 401 | 395 | 401 |
| FBP, 99.5 wt % off (° C.) | 491 | 492 | 495 | 495 | 480 | 487 | 488 | 489 |
| NMR Data | | | | | | | | |
| Aromatic 1H, % | 0.16 | 0.16 | 0.15 | 0.18 | 0.15 | 0.16 | 0.18 | 0.17 |
| Paraffinic 1H, % | 92.47 | 92.43 | 92.53 | 92.46 | 92.53 | 92.49 | 92.52 | 92.48 |
| Olefinic 1H, % | 7.31 | 7.42 | 7.32 | 7.35 | 7.32 | 7.36 | 7.30 | 7.35 |

Based on the current examples, the onset temperature for depolymerization of a mixed polyolefin feed with metal oxides can be reduced by at least 5%, when compared to depolymerization without the metal oxide. This translates into a lower temperature and residence time in a depolymerization unit. Further, the metal oxides were able to reduce the amounts of heavier compounds in the liquid product, as confirmed by reductions in the final boiling points data determined by the SimDist data. This results in a more cost effective and quicker treatment of polyolefins, as well as an improved product for downstream processing.

Further, the selection of metal oxides can be customized to the composition of the polyolefin feed to achieve the improved depolymerization results. For instance, $Al_2O_3 \cdot TiO_2$ decreases the onset temperature needed to treat a PP stream to a much greater extent that MgO or $WO_3$. However, the opposite may be true for a PE only stream or a mixed PE/PP stream.

To further illustrate how the effects of the metal oxide may change with the composition of the polyolefin feed, a series of TGA thermolysis reactions were performed for three different polyolefin streams and two different metal oxides. The TGA depolymerization half time for each example is shown in Table 5.

TABLE 5

TGA depolymerization of various polymer streams with subvalent metal oxide

| | No oxide | 2.5% $Sb_2O_3$ | 2.5% $Bi_2O_3$ |
|---|---|---|---|
| HDPE | 266 | 165 | 173 |
| HDPE + PP (1:1) | 96 | 60 | 86 |
| PP | 32 | — | 30 |

Both metal oxides were able to reduce the depolymerization half time when compared to the example that did not use a metal oxide, which translates into a higher depolymerization rate in a reactor. However, the reduction in the half time was not the same for each polyolefin. $Sb_2O_3$ reduced the depolymerization half time to 165 (about a 40% reduction) for a HDPE stream. However, the depolymerization half time for a HDPE/PP stream was reduced by about 35%. Similarly, $Bi_2O_3$ reduced the depolymerization half time for the HDPE stream by about 35%, but reductions of about 10% or less were observed with the HDPE/PP and PP stream.

A series of examples of a polypropylene feed were also depolymerized using the Hastelloy Parr Reactor. For the depolymerization using the Parr reactor, 20 g of the polymer feed along with 2.5% by weight of a metal oxide, was placed in a closed 125 ml Parr reactor, at 11 psig pressure and constant nitrogen flow of 100 sccm. The Parr rector was then placed in the hot zone of a furnace preheated to 650° C. The vapors exiting the Parr reactor were condensed in an ice trap to create the liquid product for analysis. The depolymerization efficiency was characterized by temperature of reaction mixture when condensation of liquid product first observed ($T_{onset}$); yield of liquid (L %) condensable in the ice trap, and the yield of solid residue (S %) in the reactor, excluding the catalyst.

Table 6 displays the results for the PP polymer feed mixed with 1:1 molar ratio of two metal oxides. Comparative Example 4 was depolymerized without a metal oxide, resulting in an onset temperature of 345° C. and a depolymerization time of 180 minutes.

TABLE 6

Results from Glass Reactor depolymerization of PP with metal oxide

| Process Parameter/Liquid Property | Comp. Ex. 4 | Ex. 12 |
|---|---|---|
| Oxide | None | $BaTiO_3 + CaWO_4$ |
| Depolymerization Time | | |
| $T_{onset}$, ° C. | 180 | 120 |
| | 345 | 315 |
| L % | 73 | 89 |
| S % | 5 | 0 |
| GC Data | | |
| X < nC7 | 2.4 | 4 |
| nC7 < x < nC11 | 42 | 48 |
| nC12 < x < nC28 | 54 | 48 |
| X > C28 | 1.3 | 0 |
| NMR Date | | |
| Aromatic 1H, % | 0.01 | 0.06 |
| Paraffinic 1H, % | 92.13 | 92.52 |
| Olefinic 1H, % | 7.86 | 7.42 |

In contrast to Comparative Example 4, Example 12 in Table 6 was able to reduce the onset temperature by 60° C., improve liquid yield, and reduce high molecular weight components in the pyrolite oil with a similar distribution of olefin types and aromatics.

The presently described methods of using one or more metal oxides as initiators for the depolymerization of polyolefins streams can provide a lower energy efficiency (i.e. more cost effective) when compared to methods without the use of a metal oxide. Further, the metal oxide initiators allow for the production of predictable, and simpler, mix of reaction products, which aids in determining further processing, if any, of the reaction product stream.

The following references are incorporated by reference in their entirety ASTM D7213 ("Standard Test Method for Boiling Range Distribution of Petroleum Distillates in the Boiling Range from 100° C. to 615° C. by Gas Chromatography"), ASTM International, West Conshohocken, Pa., 2015, Ibrahim, Akram A M, et al. "Facile synthesis of tungsten oxide-bismuth vanadate nanoflakes as photoanode material for solar water splitting." *International Journal of Hydrogen Energy* 42.5 (2017): 3423-3430.

What is claimed is:

1. A method of depolymerizing polyolefins comprising:
    a) adding a polyolefin-based feed stream and at least one metal oxide to a reactor heated to a predetermined temperature; and
    b) reacting the polyolefin-based feed stream with the at least one metal oxide to depolymerize the polyolefin-based feed stream,
    wherein the ratio of polyolefin-based feed stream to metal oxide is at least 5:1.

2. The method of claim 1, wherein the at least one metal oxide is chosen from a group consisting of SnO, FeO, CuO, MgO, $TeO_2$, $NbO_2$, $MoO_2$, $MnO_2$, $TiO_2$, $WO_2$, $MoO_3$, $GeO_3$, $WO_3$, $Ag_2O$, $Sb_2O_3$, $Ga_2O_3$, $Nb_2O_3$, $CeO_2$, $V_2O_3$, $Bi_2O_3$, $Al_2O_3$, $Er_2O_3$, $In_2O_3$, $B_2O_3$, PdO, $Sb_2O_5$, $Y_2O_3$, $SnO_2$, $Fe_2O_3$, $PtO_2$, $ZrO_2$, $BaTiO_3$, $CaWO_4$ or combinations thereof.

3. The method of claim 2, wherein the at least one metal oxide is Aluminum Titanium Oxide ($Al_2O_3*TiO_2$).

4. The method of claim 1, wherein the polyolefin-based feed stream is a low density polyethylene, a high density polyethylene, a polypropylene, or a combination thereof.

5. The method of claim 1, wherein the polyolefin-based feed stream is post-consumer waste.

6. The method of claim 1, wherein the polyolefin-based feed stream is post-industrial waste.

7. The method of claim 1, wherein the polyolefin-based feed stream comprises both post-industrial waste and post-consumer waste.

8. The method of claim 1, wherein the rate of depolymerization of the polyolefin-based feed stream is at least 10% higher than the rate of depolymerization for the polyolefin-based feed stream without the metal oxide.

9. The method of claim 1, wherein the rate of depolymerization in the presence of a metal oxide is 15% less than the rate of depolymerization of the polyolefin-based feed stream without the metal oxide.

10. The method of claim 1, wherein the ratio of polyolefin-based feed stream to metal oxide is at least 20:1.

11. The method of claim 1, wherein the ratio of polyolefin-based feed stream to metal oxide is at least 50:1.

12. A method of depolymerizing a polyolefin-based feed stream comprising:
    a) adding a polyolefin-based feed stream comprising high density polyethylene and polypropylene and at least one metal oxide in a reactor at a predetermined temperature; and
    b) reacting the polyolefin-based feed stream with the at least one metal oxide to depolymerize the polyolefin-based feed stream and produce a liquid product having a final boiling point less than 500° C.

13. The method of claim 12, wherein the ratio of polyolefin-based feed stream to metal oxide is at least 5:1.

14. The method of claim 13, wherein the ratio of polyolefin-based feed stream to metal oxide is at least 20:1.

15. The method of claim 13, wherein the ratio of polyolefin-based feed stream to metal oxide is at least 50:1.

16. The method of claim 12, wherein the at least one metal oxide is chosen from a group consisting of SnO, FeO, CuO, MgO, $TeO_2$, $NbO_2$, $MoO_2$, $MnO_2$, $TiO_2$, $WO_2$, $MoO_3$, $GeO_3$, $WO_3$, $Ag_2O$, $Sb_2O_3$, $Ga_2O_3$, $Nb_2O_3$, $CeO_2$, $V_2O_3$, $Bi_2O_3$, $Al_2O_3$, $Er_2O_3$, $In_2O_3$, $B_2O_3$, PdO, $Sb_2O_5$, $Y_2O_3$, $SnO_2$, $Fe_2O_3$, $PtO_2$, $ZrO_2$, $BaTiO_3$, $CaWO_4$ or combinations thereof.

17. The method of claim 16, wherein the at least one metal oxide is Aluminum Titanium Oxide ($Al_2O_3*TiO_2$).

18. The method of claim 12, wherein the polyolefin-based feed stream is post-consumer waste.

19. The method of claim 12, wherein an onset temperature of depolymerization for the polyolefin-based feed stream is 5% less than the onset temperature of the polyolefin-based feed stream without the metal oxide.

* * * * *